(12) United States Patent  (10) Patent No.: US 7,938,336 B2
Rhodes et al.  (45) Date of Patent: May 10, 2011

(54) APPARATUS AND METHOD FOR ISOLATING A TEMPERATURE SENSING DEVICE IN A THERMOSTAT

(75) Inventors: William D. Rhodes, Red Bud, IL (US); Carl J. Mueller, St. Louis, MO (US); John J. Heller, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 345 days.

(21) Appl. No.: 12/268,907

(22) Filed: Nov. 11, 2008

(65) Prior Publication Data

US 2009/0069946 A1 Mar. 12, 2009

(51) Int. Cl.
*F24F 11/053* (2006.01)
(52) U.S. Cl. ........................................ 236/1 C
(58) Field of Classification Search .................. 236/1 C, 236/46 R, 78 R
See application file for complete search history.

(56) References Cited

U.S. PATENT DOCUMENTS

| | | | | |
|---|---|---|---|---|
| 5,485,954 | A | * | 1/1996 | Guy et al. .................... 236/78 R |
| 5,558,436 | A | * | 9/1996 | Richards ....................... 374/208 |
| 6,032,867 | A | | 3/2000 | Dushane et al. ................ 236/51 |

* cited by examiner

*Primary Examiner* — Melvin Jones
(74) *Attorney, Agent, or Firm* — Harness, Dickey & Pierce, P.L.C.

(57) ABSTRACT

An improved thermostat is provided that comprises a first wall disposed within the thermostat, which partitions off a portion of the interior space to form a compartment along a side wall of the thermostat that is separated from the rest of the thermostat's interior space. The thermostat includes a second wall that is adjacent to and spaced from the first wall, so as to define an insulating space between the compartment and the rest of the interior space. The thermostat further includes a first aperture that permits communication of airflow in a lower portion of the compartment, and a second aperture that permits communication of airflow at an upper portion of the compartment. A temperature sensing element is disposed within the compartment defined by the first wall. The temperature sensing device is thermally insulated from heat generated in the interior of the thermostat by the insulating space between the compartment and interior space.

20 Claims, 6 Drawing Sheets

APPARATUS AND METHOD FOR ISOLATING A TEMPERATURE SENSING DEVICE IN A THERMOSTAT

FIELD

The present disclosure relates to thermostats, and more particularly to temperature sensors within digital thermostats for controlling HVAC systems.

BACKGROUND

The statements in this section merely provide background information related to the present disclosure and may not constitute prior art.

SUMMARY

Various embodiments are provided of an improved thermostat having opposing housing portions that mate to enclose a circuit board therein, which embodiments provide for improved sensing of ambient temperature. One embodiment of an improved thermostat comprises a first wall disposed within the interior space of the housing, which partitions off a portion of the interior space to form a compartment along a side wall of the housing that is separated from the rest of the interior space in the housing. The thermostat includes a second wall disposed within the interior space of the housing, which is adjacent to and spaced from the first wall so as to define an insulating space between the compartment and the rest of the interior space in the housing. The thermostat further includes a first aperture disposed in the housing that permits communication of airflow in a lower portion of the compartment, and a second aperture disposed in the housing that permits communication of airflow at an upper portion of the compartment. A temperature sensing element is disposed within the compartment space defined by the first wall. The temperature sensing device is thermally insulated from heat generating devices in the thermostat's interior space by the insulating space disposed between the compartment and the interior space in which the heat generating devices are disposed.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1-6, a first embodiment of an improved thermostat 100 is shown that includes a temperature sensing element within a compartment 106 inside the thermostat. The thermostat 100 includes a heat generating component, such as an electrical switching device, that is beneath the thermostat's cover 120. The switching device may be configured to switch electrical power to a load, for example, and generates heat that is dissipated into the interior space of the thermostat housing. Such heat can negatively affect the ability of a temperature sensing element of the thermostat to accurately sense the ambient temperature of the space the thermostat is controlling.

Figure 6:
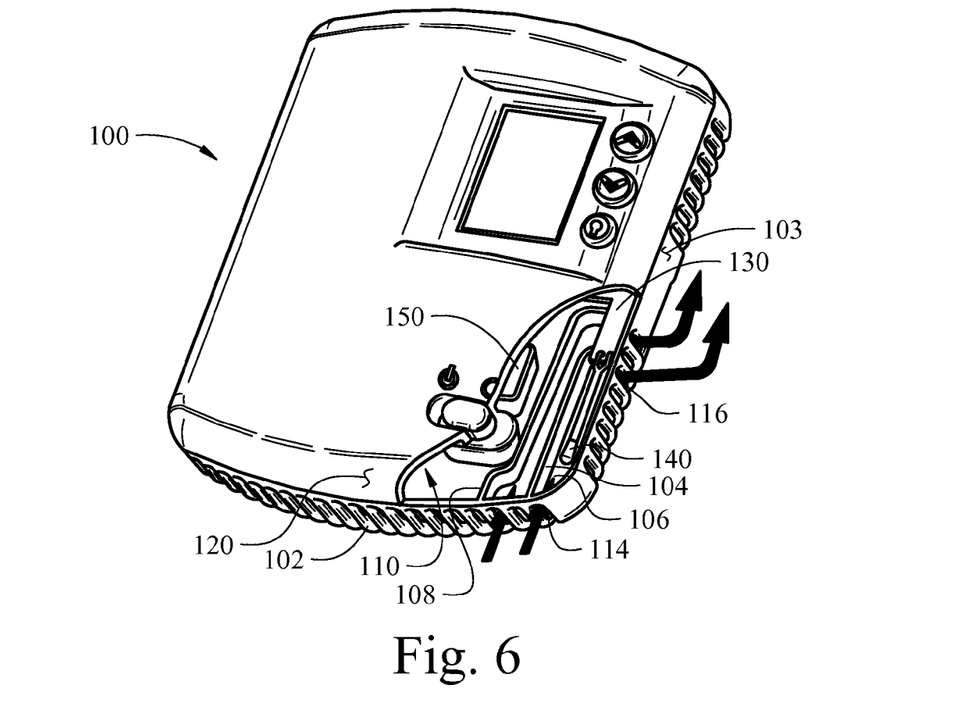

Accordingly, one first embodiment of an improved thermostat 100 shown in FIGS. 1-6 includes a base portion 102 and a cover portion 120 that mate to form a housing that includes a circuit board (shown in FIG. 6). Referring to FIG. 6, the thermostat 100 comprises a first wall 104 disposed within the interior space 110, which partitions off a portion of the interior space 110 to form a compartment 106 along a side wall 103 of the thermostat 100. The compartment 106 is thereby separated by the wall 104 from the rest of the interior space 110. The thermostat 100 further includes a second wall 108 disposed within the interior space 110 of the thermostat, which is adjacent to and spaced from the first wall 104 so as to define an insulating space 112 (see FIG. 7) between the compartment 106 and the rest of the interior space 110 of the thermostat 100. The thermostat 100 further includes a first aperture 114 in the thermostat near the lower portion of the compartment 106. This first aperture 114 permits communication of airflow in a lower portion of the compartment 106. The thermostat 100 includes a second aperture 116 disposed in the thermostat above the first lower aperture 114, where the second upper aperture 116 permits communication of airflow at an upper portion of the compartment 106.

A temperature sensing element 140 is provided that includes electrical leads 142 extending to a circuit board 130. The temperature sensing element 140 is disposed within the compartment 106 that is formed by the first wall 104, which may depend from the base portion 102 or the cover portion 120. The first wall 104 may be a single wall that depends from either one of the opposing housing portions, and may further extend into the other opposing housing portion, to thereby partition off the compartment from the rest of the interior space 110 of the thermostat when the housing portions are assembled. It should be noted that the temperature sensing element 140, or the circuit board 130, or both, may be disposed between the base portion 102 and cover portion 120, or alternatively disposed within one housing portion or the other.

Figure 1:
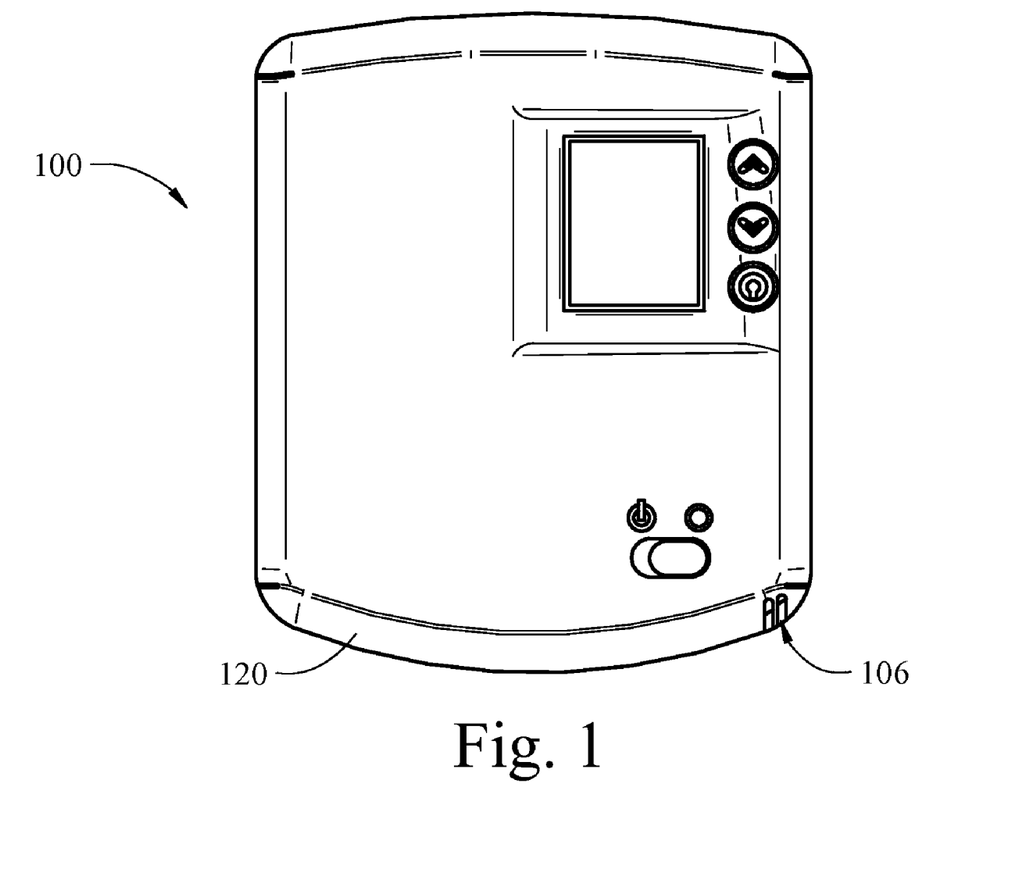
FIGS. 1 through 6 show various views of one embodiment of a thermostat having a temperature sensing device within a compartment in accordance with the present invention.
Figure 2:
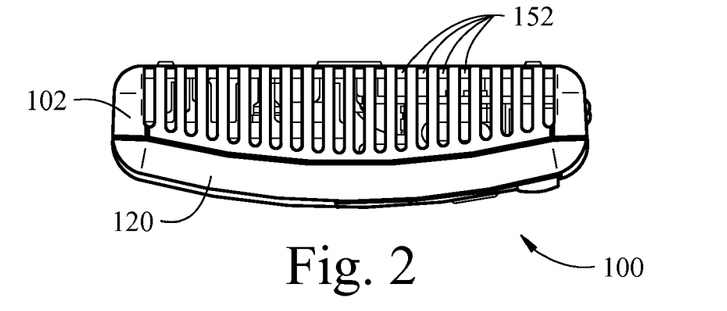
Figure 3:
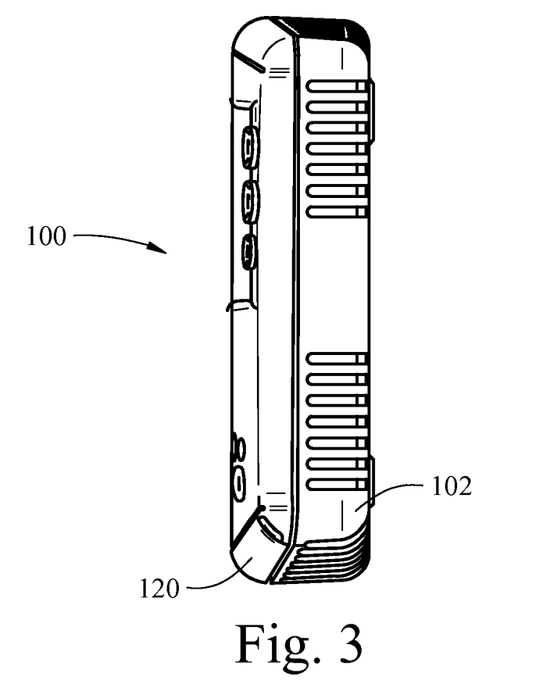
Figure 4:
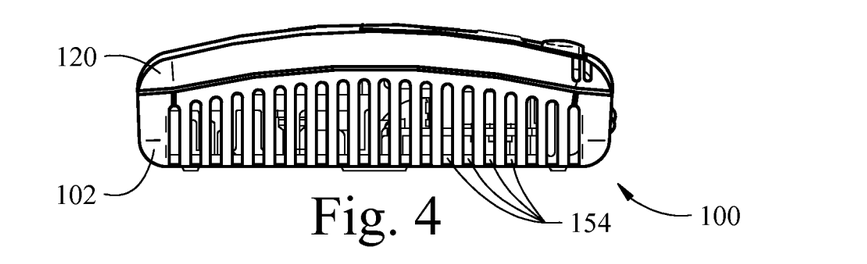
Figure 5:
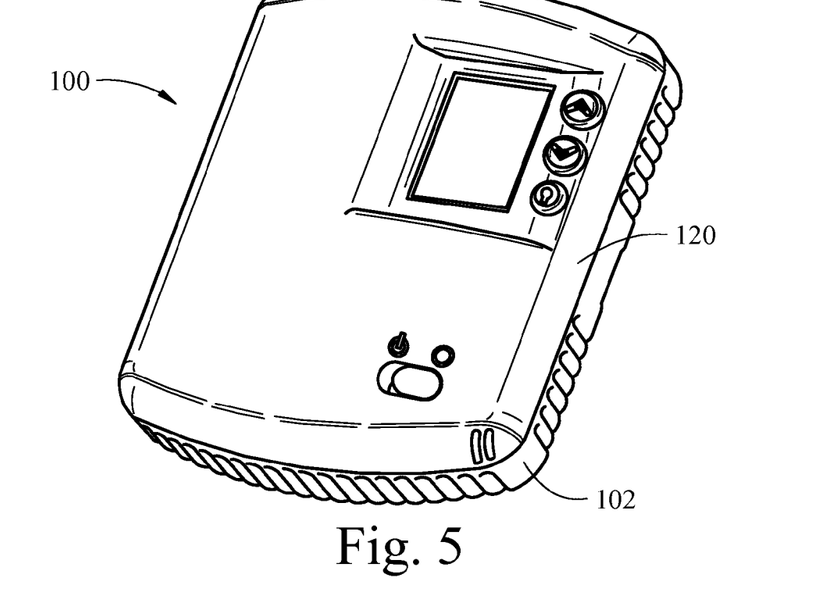

Because of the thermal generating device within the interior space of the thermostat, the heated air surrounding the device rises upward and escapes through vents 152 in the top of the thermostat (see FIG. 2). This heated air escaping the top of the thermostat housing creates a chimney effect that draws ambient air in through vents 154 (see FIG. 4) in the bottom of the thermostat. The heated air rising through the thermostat creates an upward draft of airflow below the thermostat. In addition to the upward draft that pulls heat out of the interior of the thermostat, ambient air is also permitted to pass through the first lower aperture 114 leading to the compartment 106, and to pass through the second upper aperture 116 within the compartment 106. Accordingly, the positioning of the compartment 106 along the sidewall 103 of the thermostat with the second aperture 116 disposed above the first aperture 114 permits the temperature sensing element 140 to sense the temperature of the ambient air flowing through the compartment 106. Moreover, the temperature sensing element 140 accurately senses temperature without being affected by heat generating devices within the interior space of the thermostat. This is because the temperature sensing device is thermally insulated from heat generating devices by the insulating space disposed between the compartment and the remaining interior space in which said heat generating devices are disposed.

Figure 7:
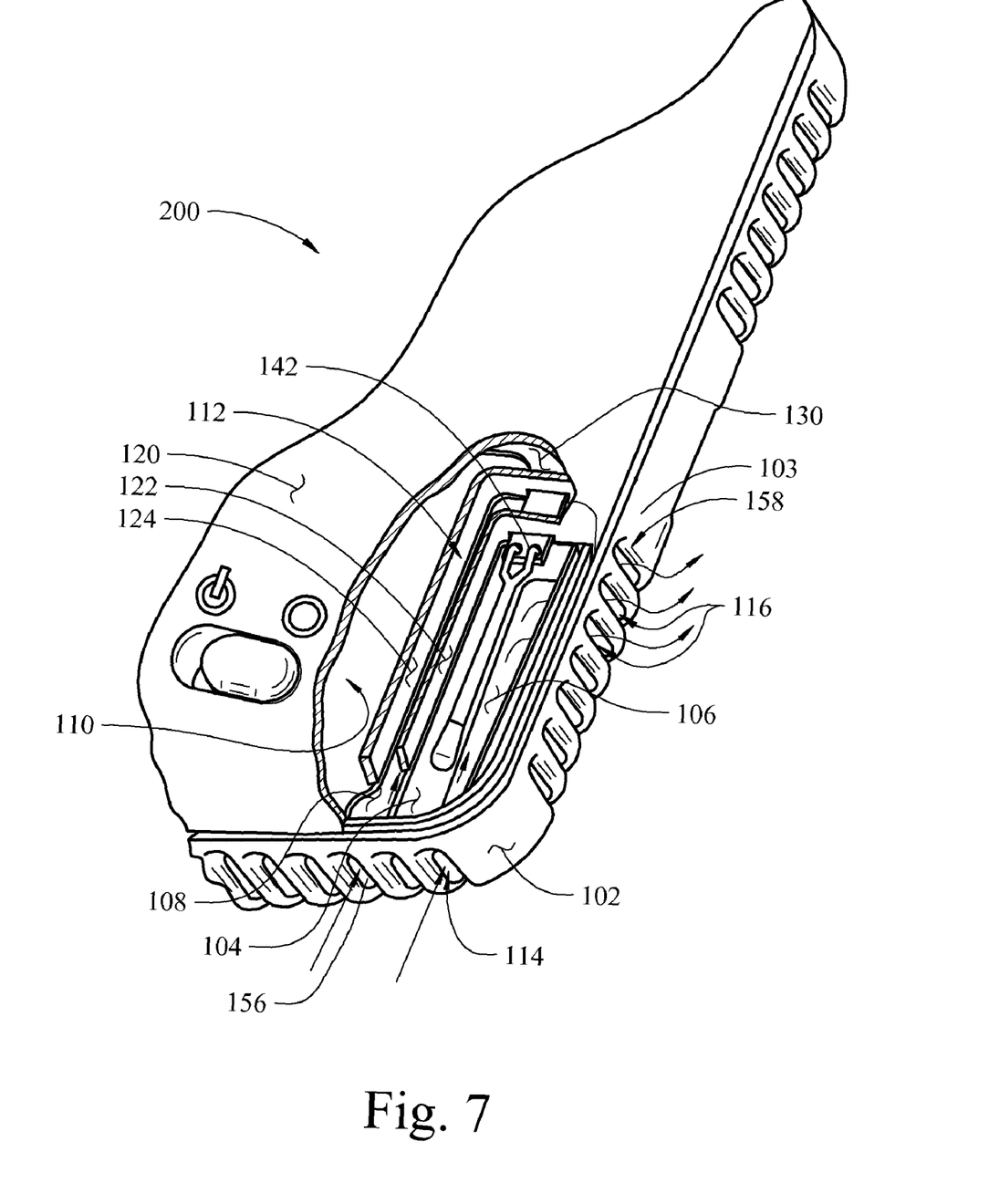
FIG. 7 shows a cut-away view of a second embodiment of a thermostat having a temperature sensing device within a compartment in accordance with the present invention.

Referring to FIG. 7, a second embodiment of a thermostat 200 is shown. In the second embodiment, the thermostat 200 comprises a base portion 102 and a cover portion 120 that mate to form a housing in which a circuit board 130 is included. The second embodiment includes a temperature sensing element 140 that is connected to the circuit board 130.

The base portion 102 has sidewalls 103 defining an interior space 110, and a first wall 104 and second wall 108 disposed therein. The first wall 104 is disposed within the interior space 110 of the base portion 102, and partitions off a portion of the interior space 110 to form a compartment 106 along a sidewall 103 of the base portion 102 that is separate from the rest of the interior space 110. The second wall 108 is disposed within the interior space 110, and is adjacent to and spaced from the first wall 104 so as to define an insulating space 112 between the compartment 106 and the rest of the interior space 110. A first lower aperture 114 is disposed in the base portion sidewall, where the first lower aperture 114 permits communication of airflow in a lower portion of the compartment 106. A second upper aperture 116 is disposed in the base portion sidewall 103 above the first lower aperture 114, where the second upper aperture 116 permits communication of airflow at an upper portion of the compartment 106. It should be noted that the at least one lower aperture 114 or vent opening in communication with a lower portion of the compartment may comprise at least two or more apertures, and the at least one upper aperture 116 or vent opening in communication with an upper portion of the compartment may comprise at least two or more upper apertures.

The cover portion 120 also has sidewalls defining an interior space, and a first wall 122 and second wall 124 therein. The first wall 122 is disposed within the interior space of the cover portion 120, which partitions off a portion of the interior space to form a compartment 106' that is separate from the interior space and aligned with the compartment 106 in the base portion 102. Specifically, when the base portion 102 and the cover portion 120 are assembled, the cover compartment 106' is in corresponding alignment with the base compartment 106. A second wall 124 is disposed on the cover 120, and is adjacent to and spaced from the first wall 122 so as to define an insulating space 112' between the compartment 106' and the rest of the cover portion 120. The cover second wall 122 is in corresponding alignment with the base second wall 108, such that the cover insulating space 112' is in alignment with the insulating space 112 of the base portion 102.

The thermostat 200 includes a temperature sensing element 140 disposed within the compartment space 106 defined by the base portion 102 and cover portion 120. The temperature sensing element 140 has electrical leads 142 extending to a circuit 130 between the first and second walls 104, 108 in the base portion 102, and the first and second walls 122, 124 in the cover portion 120. The positioning of the compartment 106 along the sidewall of the thermostat 200, with the second upper aperture 116 disposed above the first lower aperture 114 permits the sensing element 140 to accurately sense the temperature of the ambient air flowing through the compartment 106, without being affected by heat generating devices within the interior of the thermostat 200. This is because the temperature sensing device 140 is thermally insulated from heat generating devices by the insulating space 112 disposed between the compartment 106 and the remaining interior space 110 in which the heat generating devices are disposed.

The thermostat 200 further includes at least one electrical component 150 disposed within an interior space 110 that is partitioned off from the compartment 106, where the heat generated by the at least one electrical component 150 is insulated from the compartment 106 by the insulating space 112. The at least one electrical component 150 may be a transformer, for example, or the at least one electrical component may further be another electrical component, such as a switch device configured to switch a line voltage source to a load. The switch may be a Field Effect Transistor (FET), or a solid-state type of switching device, such as Triac device 170 shown in FIG. 10. The thermostat 200 may further include a heat sink 160 associated with the switch, where the heat sink 160 is disposed within a portion of the interior space 110 that is removed from the compartment 106, or within a subsection of the interior space. The heat sink 160 is positioned away from the compartment 106, such that heat dissipated by the transformer, the switch, and the heat sink 160 is insulated from the compartment 106 by the insulating space 112.

The thermostat 200 further comprises a series of vent holes 152, 154 above and below the thermostat 200 to permit airflow into and out of the interior space 110 of the thermostat 200. The thermostat 200 also includes a first aperture 156 or vent opening disposed in the base portion 102 that permits communication of airflow in a lower portion of the insulating space 112, and a second aperture 158 or vent opening disposed in the base portion 102 or side wall 103 permitting communication of airflow at an upper portion of the insulating space 112. The electrical component may generate an amount of heat that is sufficient to cause the air within the interior space 110 to rise and create an updraft of air flow through the vent holes 152 in the thermostat 200. In addition to the upward draft that pulls heat out of the interior of the thermostat, ambient air is also permitted to pass through the first lower aperture 114 leading to the compartment 106, and to pass through the second upper aperture 116 within the compartment 106. Accordingly, the positioning of the compartment 106 along the sidewall 103 of the thermostat with the second aperture 116 disposed above the first aperture 114 permits the temperature sensing element 140 to sense the temperature of the ambient air flowing through the compartment 106. The lower vent openings 156 and upper vent openings 158 leading to the insulating space 112 also permit entry of ambient air into the insulating space 112. This communication of ambient air to the insulating space 112 helps to convey heat out of the insulating space 112.

Figure 8:
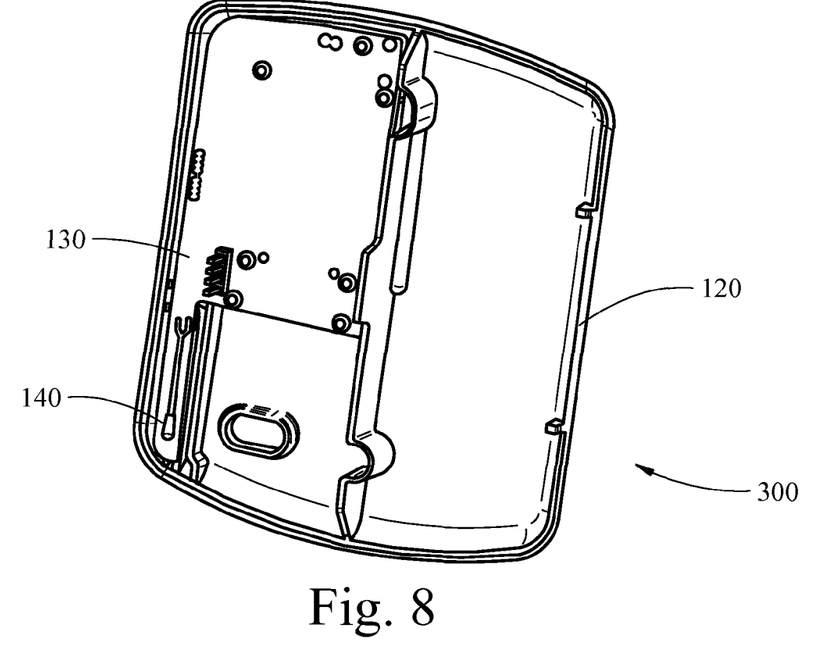
FIGS. 8 through 10 show various views of a third embodiment of a thermostat having a temperature sensing device within a compartment in accordance with the present invention.
Figure 9:
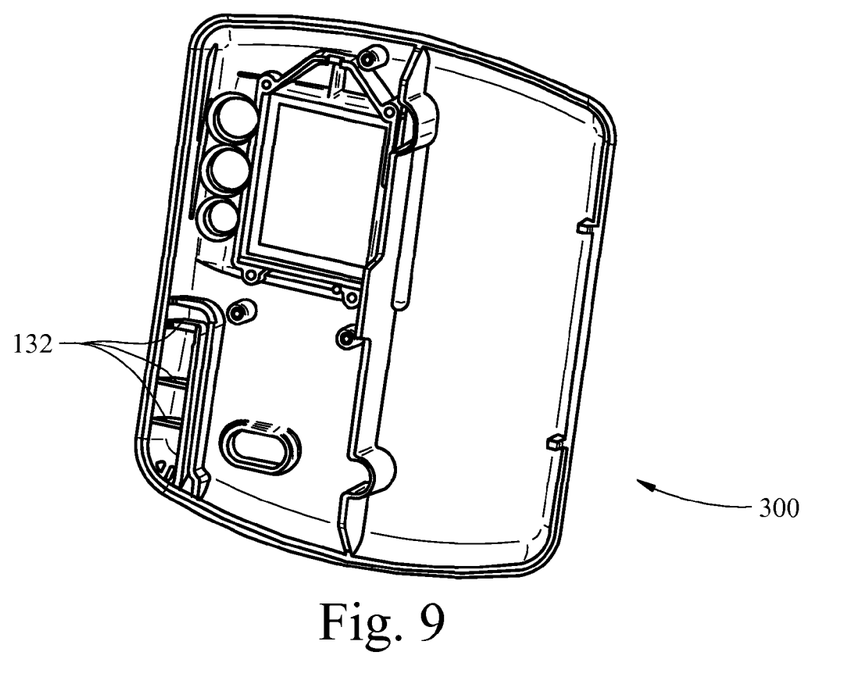
Figure 10:
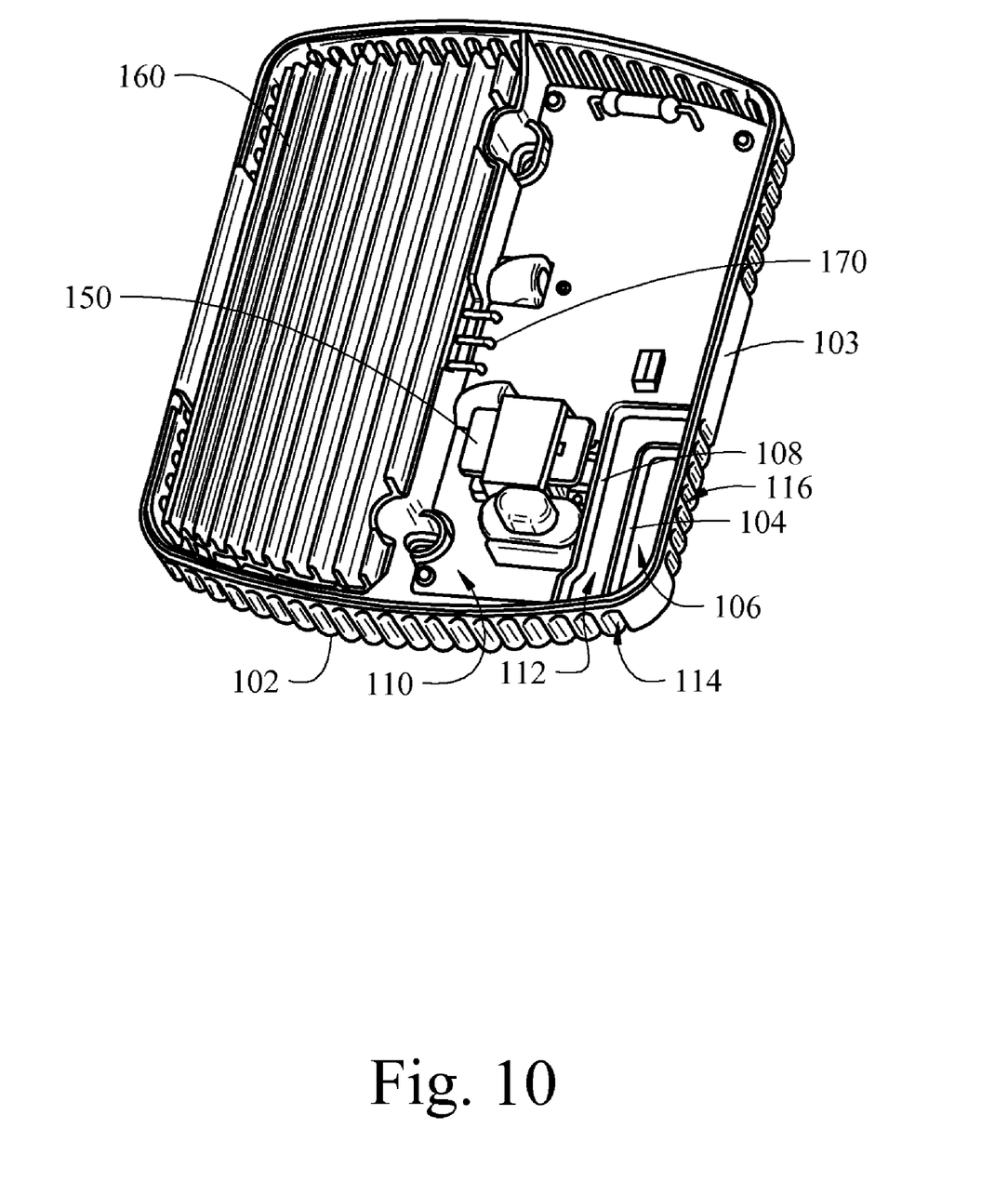

Referring to FIGS. 8-10, a third embodiment of a thermostat 300 is shown. The thermostat 300 includes opposing housing portions that mate to enclose a circuit board 130 therein. One portion 120 of the thermostat 300 housing shown in FIG. 9 has interior walls 132 within the interior space 110 that define a receiving area for the circuit board 130. The thermostat housing portion 102 shown in FIG. 10 includes a first wall 104 disposed within the interior space 110 of the thermostat housing portion 102, which partitions off a portion of the interior space 110 to form a compartment 106 along a sidewall of the thermostat housing portion 102 that is separated from the rest of the interior space 110. The thermostat housing portion 102 further includes a second wall 108 disposed within the interior space 110, which is adjacent to and spaced from the first wall 104 in the thermostat housing portion 102, so as to define an insulating space 112 between the compartment 106 and the remaining interior space 110 of the thermostat housing portion 102. A first aperture 114 is disposed in a sidewall of the thermostat housing portion 102, where the first aperture 114 permits communication of airflow in a lower portion of the compartment 106. A second aperture 116 is disposed in the sidewall of the thermostat housing portion 102 above the first aperture 114, where the second aperture 116 permits communication of airflow at an upper portion of the compartment 106.

A circuit board 130 positioned within the housing portion 120 is configured to be received against the first wall 104 and the second wall 108 of the thermostat housing portion 102, to thereby form an enclosure space between the circuit board 130 and the compartment 106 formed within the thermostat housing portion 102 by the first wall 104. The circuit board 130 includes a heat generating component 150 that is disposed within the remaining interior space 110 of the thermostat housing portion 102, which is separated from the compartment 106 by the insulating space 112. A temperature sensing element 140 is disposed within the enclosure or compartment between the circuit board 130 and the compartment space 106 formed within the thermostat housing portion 102 by the first wall 104. The temperature sensing element 140 has electrical leads 142 extending to the circuit board 130, whereby the temperature sensing element 140 is thermally insulated from the heat generating component 150 within the interior space 110 of the thermostat housing 102 by the insulating space 112.

Because of the thermal generating device within the interior space of the thermostat, the heated air surrounding the device rises upward and escapes through vents 152 in the top of the thermostat (see FIG. 2). This heated air escaping the top of the thermostat housing creates a chimney effect that draws ambient air in through vents 154 (see FIG. 4) in the bottom of the thermostat. The heated air rising through the thermostat creates an upward draft of airflow below the thermostat, which causes ambient air to flow through the first lower aperture 114 and enter into the compartment 106, and to flow through the second upper aperture 116 and out of the compartment 106.

Accordingly, the positioning of the compartment 106 along the sidewall of the thermostat housing 102, with the second aperture 116 disposed above the first aperture 114 permits the temperature sensing element 140 to accurately sense the temperature of the ambient air flowing through the compartment 106, without being affected by heat generating devices in the interior of the thermostat. This is because the temperature sensing device 140 is thermally insulated from heat generating devices 150 by the insulating space 112 disposed between the compartment 106 and the remaining interior space 110 in which the heat generating device 150 is disposed.

It will be understood by those skilled in the art that the insulated temperature sensing element provided by the present design may be employed in any thermostat that is used or designed to control a cooling load or a heating load. Accordingly, it should be understood that the disclosed embodiments of a latching relay control circuitry, and variations thereof, may be employed in any apparatus utilizing one or more latching relays for controlling one or more loads.

What is claimed is:

1. An improved thermostat having opposing housing portions that mate to enclose a circuit board therein, the improved thermostat comprising:
a first wall disposed within an interior space of the housing, which partitions off a portion of the interior space to form a compartment along a side wall of the housing, said compartment being separated from the rest of the interior space in the housing,
a second wall disposed within the interior space of the housing, which is adjacent to and spaced from the first wall so as to define an insulating space between the compartment and the rest of the interior space in the housing,
a first aperture disposed in a housing sidewall, said first aperture permitting communication of airflow in a lower portion of said compartment,
a second aperture disposed in a housing sidewall above the first aperture, the second aperture permitting communication of airflow at an upper portion of the compartment; and
a temperature sensing device disposed within the compartment space defined by the first wall, said temperature sensing device having electrical leads extending to a circuit, being disposed between a base portion and cover portion forming said housing, whereby the temperature sensing device is thermally insulated from heat generating devices by the insulating space disposed between the compartment and a remaining portion of the interior space in which said heat generating devices are disposed.

2. The thermostat of claim 1 wherein the first wall depends from a first housing portion, and the second wall depends from a second housing portion opposing the first housing portion.

3. The thermostat of claim 1 wherein said first wall extends into the opposing housing portion, and said second wall extends into the opposing housing portion.

4. The thermostat of claim 1 wherein said first wall and said second wall depend from a first housing portion.

5. The thermostat of claim 4 wherein a second housing portion opposing the first housing portion further includes a first and second walls corresponding to and aligned with the first and second walls of the first housing portion.

6. The thermostat of claim 1 wherein the circuit board is positioned on the thermostat housing portion against the first wall and the second wall of the thermostat housing portion, to thereby form an enclosure between the circuit board and the compartment formed within the thermostat housing portion.

7. The thermostat of claim 1 further comprising a switch configured to switch a line voltage source, said switch being disposed within the interior space that is partitioned off from said compartment such that heat generated by said switch is insulated from said compartment by said insulating space.

8. The thermostat of claim 7 further comprising a first aperture disposed in a housing sidewall permitting communication of airflow in a lower portion of said insulating space, and a second aperture disposed in a housing sidewall permitting communication of airflow at an upper portion of the said insulating space.

9. The thermostat of claim 1, wherein said at least one aperture in communication with a lower portion of said compartment comprises at least two apertures.

10. A thermostat having a base portion and a cover portion that mate to form a housing in which a circuit board is included, comprising:
a base portion having sidewalls defining an interior space, said base portion including:
a first wall disposed within the interior space of the base portion, which partitions off a portion of the interior space to form a compartment along a sidewall of the base portion that is separated from the rest of the interior space, a second wall disposed within the interior space, which is adjacent to and spaced from the first wall so as to define an insulating space between the compartment and the rest of the interior space of the base portion, a first aperture disposed in the base portion sidewall, said first aperture permitting communication of ambient air in a lower portion of said compartment, a second aperture disposed in the base portion sidewall above the first aperture, the second aperture permitting communication of ambient air at an upper portion of the compartment;

a cover portion having sidewalls defining an interior space, said cover portion including:

a first wall disposed within the interior space of the cover portion, which partitions off a portion of the interior space to form a compartment along a sidewall of the cover portion that is separated from a remaining portion of the interior space, said cover compartment being in corresponding alignment with said base compartment, a second wall disposed within the interior space, which is adjacent to and spaced from the first wall so as to define an insulating space between the compartment and the rest of the interior space of the base portion, said cover second wall being in corresponding alignment with said base second wall; and a temperature sensing element disposed within the compartment space defined by the base portion and cover portion, said temperature sensing element having electrical leads extending to a circuit between said first and second walls in said base portion and said first and second walls in said cover portion.

11. The thermostat of claim 10 further comprising an electrical component disposed within the interior space that is partitioned off from said compartment such that heat generated by said switch is insulated from said compartment by said insulating space.

12. The thermostat of claim 11 further comprising a first aperture disposed in a housing sidewall permitting communication of airflow in a lower portion of said insulating space, and a second aperture disposed in a housing sidewall permitting communication of airflow at an upper portion of the said insulating space.

13. The thermostat of claim 10, wherein the positioning of the compartment along a sidewall of the base portion, with the a second aperture disposed in the base portion sidewall above the first aperture, permits ambient air to pass through the compartment such that the temperature sensing element disposed in the compartment senses the temperature of ambient air entering the compartment.

14. The thermostat of claim 13 wherein said at least one aperture in communication with a lower portion of said compartment comprises at least two lower apertures, and said at least one aperture in communication with an upper portion of said compartment comprises at least upper two apertures.

15. The thermostat of claim 11 wherein said electrical component comprises a switch device configured to switch a line voltage source to a load.

16. The thermostat of claim 15 further comprising a heat sink associated with said switch, said heatsink being disposed within the interior space that is partitioned off from said compartment such that heat generated by said switch is insulated from said compartment by said insulating space.

17. A thermostat having opposing portions of a housing that mate to enclose a circuit board therein, comprising:

a portion of a thermostat housing having sidewalls defining an interior space, the thermostat housing portion including a first wall disposed within the interior space of the thermostat housing portion, which partitions off a portion of the interior space to form a compartment along a sidewall of the thermostat housing portion that is separated from the rest of the interior space, the thermostat housing portion further including a second wall disposed within the interior space of the thermostat housing portion, which is adjacent to and spaced from the first wall in the thermostat housing portion, so as to define an insulating space between the compartment and the remaining interior space of the thermostat housing portion;

at least one lower aperture disposed in a sidewall of the thermostat housing portion, said at least one lower aperture permitting communication of airflow in a lower portion of said compartment;

at least one upper aperture disposed in the sidewall of the thermostat housing portion above the lower aperture, the at least one upper aperture permitting communication of airflow at an upper portion of the compartment;

a circuit board positioned on the thermostat housing portion against the first wall and the second wall of the thermostat housing portion, to thereby form an enclosure between the circuit board and the compartment formed within the thermostat housing portion, said circuit board having a thermal generating component that is disposed within a remaining portion of the interior space of the thermostat housing portion, which is separated from the compartment by the insulating space; and a temperature sensing element disposed within the enclosure between the circuit board and the compartment formed within the thermostat housing portion, said temperature sensing element having electrical leads extending to the circuit board, whereby the temperature sensing element is thermally insulated from the thermal generating component in the interior space of the thermostat housing.

18. The thermostat of claim 17 further comprising at least one lower vent opening disposed in a housing sidewall that permits communication of airflow in a lower portion of said insulating space, and at least one upper vent opening disposed in a housing sidewall permitting communication of airflow at an upper portion of the said insulating space.

19. The thermostat of claim 17 wherein the thermal generating component generates an amount of heat that is sufficient to cause the air within the interior space to rise and create an updraft of air flow through the thermostat, whereby said lower apertures permit airflow established by said updraft to enter the compartment and said upper apertures permit airflow established by said updraft to exit the compartment, to thereby establish ambient airflow across the temperature sensing element disposed within the compartment.

20. The thermostat of claim 18 wherein said lower vent openings permit airflow established by said updraft to enter the insulating space and said upper vent openings permit airflow established by said updraft to exit the insulating space, to thereby establish ambient airflow through the insulating space to provide for convection of heat out of said insulating space.

* * * * *